United States Patent [19]

Pitzer

[11] Patent Number: 5,614,012
[45] Date of Patent: Mar. 25, 1997

[54] HIGHLY TRANSPARENT, RED IRON OXIDE PIGMENTS, PROCESS FOR THE PRODUCTION THEREOF AND USE THEREOF

[75] Inventor: Ulrike Pitzer, Krefeld, Germany

[73] Assignee: Bayer Aktiengesellschaft, Leverkusen, Germany

[21] Appl. No.: 531,002

[22] Filed: Sep. 20, 1995

[30] Foreign Application Priority Data

Sep. 30, 1994 [DE] Germany .......................... 44 34 968.8

[51] Int. Cl.⁶ .............................. C01G 49/02; C08K 3/22; C09D 17/00
[52] U.S. Cl. ........................................... 106/456; 423/633
[58] Field of Search ............................ 106/456; 423/633

[56] References Cited

U.S. PATENT DOCUMENTS

| | | | |
|---|---|---|---|
| 2,558,303 | 6/1951 | Marcot et al. | 106/456 |
| 2,558,304 | 6/1951 | Marcot et al. | 106/456 |
| 4,348,240 | 9/1982 | Patil et al. | 106/456 |
| 4,758,415 | 7/1988 | Patil | 423/633 |

FOREIGN PATENT DOCUMENTS

| | | |
|---|---|---|
| 3026686 | 2/1982 | Germany . |
| 3640245 | 5/1988 | Germany . |
| 2271766 | 4/1994 | United Kingdom . |

*Primary Examiner*—Melissa Bonner
*Attorney, Agent, or Firm*—Connolly & Hutz

[57] ABSTRACT

The present invention relates to a process for the production of red, transparent iron oxide pigments of elevated chemical purity, to iron oxide pigments obtainable in this manner and to the use thereof to color lacquers and plastics.

9 Claims, No Drawings

HIGHLY TRANSPARENT, RED IRON OXIDE PIGMENTS, PROCESS FOR THE PRODUCTION THEREOF AND USE THEREOF

The present invention relates to a process for the production of red, highly transparent iron oxide pigments of elevated chemical purity, to iron oxide pigments obtainable in this manner and to the use thereof for colouring lacquers and plastics.

Iron oxide pigments having an average particle size of less than 0.1 μm are described as transparent iron oxide pigments as they transmit visible light. As an alternative to the particle size, the specific surface area is often used as a measure of the size of the particles. In particular in the case of acicular particles, this measure avoids stating particle sizes in various dimensions. In this manner, powders having BET specific surface areas of over 80 m$^2$/g may be described as transparent. Highly transparent pigments are those having specific surface areas of at least 100 m$^2$/g.

Transparent iron oxide pigments are principally used in the production of automotive effect lacquers, wood varnishes and for colouring transparent plastics.

Red, transparent iron oxide pigments are generally produced by calcining yellow, transparent iron oxide pigments. These yellow precursors are customarily produced by precipitation of iron(II) hydroxides or carbonates in an acidic or alkaline pH range and subsequent oxidation to Fe(III) oxidehydroxides.

The precipitation of yellow α-FeOOH in an alkaline pH range is described in U.S. Pat. No. 2,558,303 and U.S. Pat. No. 2,558,304.

While production with an alkali excess does indeed give rise to products which are low in salt and are thus more readily dispersible, it does, however, have the disadvantage that many other hydroxides of metal ions, which are present as impurities in iron salt solutions used industrially, are coprecipitated in addition to the iron hydroxides. The precipitation of Mn impurities may in particular be cited. These impurities cause brownish hues in the red pigments obtained from the yellow pigments by calcination. Moreover, depending upon the particular raw material, the total content of metallic impurities may be so high that these pigments may no longer be used, for example, in plastic packaging for foodstuffs.

The production of α-FeOOH pigments in an acidic pH range has the advantage that the precipitation of foreign metal impurities is avoided, but, on the other hand, has the disadvantage that, even after vigorous washing, the pigments are still heavily contaminated with anions. Since production is generally performed on the basis of iron sulphate solutions, sulphate impurities may in particular be cited. This leads, both in the yellow pigments and the red pigments obtained therefrom by calcination, to impaired dispersibility and thus, with the same dispersion energy input, to poorer transparency in comparison with pigments produced under alkaline conditions.

U.S. Pat. No. 4,758,415 describes a process for the removal of soluble metal cations from iron oxide pigments. In this process, transparent yellow iron oxide pigments produced using an acidic precipitation process are washed with a solution containing a ligand compound, wherein the conductivity of the pigment is very low after treatment. This process cannot, however, remove metal impurities which are firmly incorporated into the pigment, which occur, for example, when the pigments are produced using alkaline precipitation processes. Ammonia is cited as a ligand compound, in addition to many other compounds. The described post-treatment of pigments with ammonia does, however, have various disadvantages. Thus, for example, on toxicity grounds it is hardly possible to wash filter cakes with ammonia on a large industrial scale. Moreover, when filter cakes are washed on a large industrial scale, it cannot be ensured that the entire product cross-section comes into contact with a sufficient quantity of and for a sufficient time with the ligand compound, such that uniform product quality cannot be achieved.

U.S. Pat. No. 4,758,415 furthermore describes pretreatment of yellow pigments produced under acidic conditions before washing with the ligand compounds as described above, by adding NaOH to the production suspension with simultaneous oxidation.

This alkalisation of the production slurry does, however, have the disadvantage that many metallic impurities still contained in the suspension from the raw material are still coprecipitated, in a similar manner as in the precipitation process in an alkaline pH range. The transparent, red iron oxide pigments produced therefrom by calcination are then also contaminated with foreign metals and have a brown cast.

The object of the invention was thus to provide high transparent, red iron oxide pigments which are chemically pure and thus very pure in colour and which do not exhibit the stated disadvantages of hitherto known pigments and industrial processes.

It has been found that comparatively very readily dispersible, highly transparent, red iron oxide pigments may also be produced using a precipitation process in an acidic pH range, calcination to yield red iron oxide pigments and post-treatment of either the yellow intermediates or the red pigments. These pigments differ from hitherto known transparent red pigments in that they are chemically pure.

The present invention also provides a process for the production of transparent, chemically pure, red iron oxide pigments, wherein a) yellow, highly transparent iron oxide pigments of the α-FeOOH modification are produced by precipitation and oxidation processes in an aqueous medium, starting from iron(II) sulphate solutions, in such a manner that on completion of pigment formation the pH value is below 6, preferably less than or equal to pH 5, b) the yellow pigment filter cake or the dried yellow pigments are calcined to yield red, highly transparent iron oxide pigments and c) the yellow intermediates and/or the red pigments are subjected to post-treatment with sodium hydroxide solution.

Production of the yellow, highly transparent intermediates in an acidic environment is known. Production preferably proceeds by introducing an industrial grade iron(II) sulphate solution into a vessel, precipitating iron(II) hydroxides or carbonates from this by adding alkaline precipitants and optionally nucleation modifiers and oxidising these hydroxides or carbonates to iron(III) oxidehydroxides. The temperature selected during precipitation should be as low as possible in order to obtain very finely divided yellow pigments; the temperature is preferably between 15° C. and 45° C. NaOH is preferably used as the alkaline precipitant. Other alkaline precipitants, such as $Na_2CO_3$, $NH_3$, MgO and/or $MgCO_3$, may however also be used without any problem. It is also possible additionally to add nucleation modifiers in order to increase the fineness of the pigments. Examples which may be cited are phosphates, metaphosphates or hydroxycarboxylic acids. The oxidation from divalent to trivalent iron is preferably performed with air. Vigorous aeration is advantageous during oxidation.

Red iron oxide pigments may be produced from the yellow iron oxide pigments or pigment filter cakes by calcination. In order to prevent sintering of the fine particles, calcination is preferably performed at temperatures of between 200° C. and 500° C. for times of between 15 minutes and 2 hours.

The post-treatment with sodium hydroxide solution may performed on the yellow intermediate or on the red pigment obtained by calcination or on the red and yellow pigment. Preferably, however, the post-treatment with sodium hydroxide solution is performed on the calcined red pigment. To this end, the calcined product is suspended in sodium hydroxide solution. Pigment concentration at this point is preferably 10 to 60 g/l. The concentration of the sodium hydroxide solution should be selected such that the pH value of the suspension is between pH 10 and pH 14. The pigment is stirred in this suspension until the saline impurities have dissolved off the surface. Times of between 15 minutes and 2 hours are sufficient for this purpose. The temperature may be selected at will between room temperature and boiling point. For example, the sodium hydroxide post-treatment may be performed at temperatures of between 15° C. and 90° C. The NaOH post-treatment is, however, preferably performed at room temperature. After the NaOH post-treatment, the pigment is filtered, dried and optionally ground.

The pigment obtained, which is provided by the present invention, consists of $\alpha$-$Fe_2O_3$ with a low content of metallic impurities, in particular a low Mn content of less than 0.1 wt. % and a low content of anionic impurities, in particular a low sulphate content of less than 1.2 wt. %. Lacquer coatings of the pigment according to the invention dispersed in a lacquer applied onto a chess board pattern exhibit elevated transparency and a deep, bright red hue. Particular emphasis should be placed upon the distinctly improved transparency in comparison with the pigment which has not been post-treated. The particularly deep hue leads to an improved coverage rate in the coloured preparation.

Plastics, as well as lacquers, may also be coloured with the pigment. Due to their low content of impurities, the pigments are in particular suitable for colouring plastics for foodstuffs packaging. The present invention thus also provides the use of the pigments according to the invention to colour lacquers and plastics.

Measurement Methods

In order to determine the Mn content, the samples are completely dissolved and the manganese contents then ascertained by emission spectrometry.

Sulphate contents are determined using the following method: the samples are combined with a vanadium pentoxide/iron powder mixture as a flux and heated to above 1,200° C. in a stream of oxygen. The resultant gases are investigated for their sulphur dioxide content using an infra-red measuring cell. The content ascertained in this manner is recalculated as sulphate.

The specific BET surface area is determined in accordance with ISO standard 9277.

The following examples describe the production of the highly transparent, chemically pure, red iron oxide pigments according to the invention. The examples are intended to illustrate the invention and do not constitute a limitation.

EXAMPLES

Example 1

50 kg of tartaric acid together with 6.3 m³ of NaOH solution with an NaOH content of 286 g/l were stirred into 57.5 m³ of an iron sulphate solution with an $FeSO_4$ content of 150 g/l at a temperature of 34° C. The pH value was pH 7.4 immediately after addition of the NaOH. The mixture was then aerated with 1,050 m³/h of air until the pH value had fallen to pH 3.3. The suspension was filtered, washed until free of salt and the pigment dried.

50 g of the dried pigment were calcined in a muffle kiln with aeration with 100 l of air/h for one hour at 300° C. to yield $\alpha$-$Fe_2O_3$. The calcined pigment has a BET specific surface area of 172 m²/g, a sulphate content of 3.55 wt. % and a manganese content of 0.03 wt. %.

20 g of the calcined pigment were thoroughly dispersed in 400 ml of 0.2N NaOH solution and stirred for one hour at room temperature. The post-treated pigment has a specific surface area of 166 m²/g, a sulphate content of 0.9 wt. % and a manganese content of 0.03 wt. %.

In order better to illustrate the properties of the product, the analytical values are compared in table 1 with commercial products Sicotrans L2815 and L2817 (products of BASF), Cappoxyt 4434 B (product of Cappelle) and Transoxide red 10-30-AC-1021 (product of Hilton Davis).

Example 2

694 g of filter paste of the pigment according to example 1 having a solids content of 23.4 wt. % of FeOOH were resuspended in 5 liters of 0.2N NaOH solution. The FeOOH content of the suspension was approximately 30 g/l. The suspension was stirred for one hour at room temperature, filtered, washed until free of salt and the pigment dried.

50 g of the dried pigment were calcined in a muffle kiln with aeration with 100 l of air/h for one hour at 300° C. to yield ($\alpha$-$Fe_2O_3$. The calcined pigment has a BET specific surface area of 115 m²/g, a sulphate content of 0.64 wt. % and a manganese content of 0.04 wt. %. The values are shown in table 1.

Example 3 (Comparative Example)

A highly transparent, yellow iron oxide pigment was produced using an alkaline precipitation process with a 30% excess of sodium hydroxide. On completion of oxidation, the pH value was pH 11.5. 50 g of the dried pigment were calcined in a muffle kiln with aeration with 100 l of air/h for one hour at 300° C. to yield $\alpha$-$Fe_2O_3$. The calcined pigment has a BET specific surface area of 107 m²/g, a sulphate content of 0.02 wt. % and a manganese content of 0.21 wt. %.

20 g of the calcined pigment were thoroughly dispersed in 400 ml of 0.2n NaOH solution and stirred for one hour at room temperature. The post-treated pigment has a BET specific surface area of 107 m²/g, a sulphate content of <0.01 wt. % and a manganese content of 0.21 wt. %. This means that the elevated pH value during production of the yellow precursor leads to an elevated manganese content in the red pigment, which is also not reduced by the sodium hydroxide solution post-treatment. The analytical results are also shown in table 1 for greater clarity.

TABLE 1

| Product | BET surface area (m²/g) | Mn content (wt. %) | SO₄ content (wt. %) |
| --- | --- | --- | --- |
| Sicotrans L 2815 | 124 | 0,04 | 2,6 |
| Sicotrans L 2817 | 103 | 0,20 | 0,8 |

TABLE 1-continued

| Product | BET surface area (m²/g) | Mn content (wt. %) | SO₄ content (wt. %) |
|---|---|---|---|
| Cappoxyt Rot 4434 B | 113 | 0,13 | 0,8 |
| Transoxide red | 109 | 0,04 | 4,3 |
| Example 1 | 166 | 0,03 | 0,9 |
| Example 2 | 115 | 0,04 | 0,6 |
| Example 3 = counterexample to 1 | 107 | 0,21 | <0,01 |

What is claimed is:

1. A process for the production of highly transparent, chemically pure, red iron oxide pigments of the $\alpha$-Fe$_2$O$_3$ modification, comprising
   a) producing yellow, highly transparent iron oxide pigments of the $\alpha$-FeOOH modification by precipitation and oxidation in an aqueous medium, starting from iron (II) sulphate solution, in such a manner that on completion of pigment formation the pH value is below 6;
   b) the yellow pigment of step (a) is calcined to yield red, highly transparent iron oxide pigments; and
   c) the red pigment is post-treated with sodium hydroxide solution.

2. A process according to claim 1, wherein the sodium hydroxide post-treatment is carried out in a suspension with a pigment content of 10 to 60 g/l.

3. A process according to claim 2, wherein the pH value of the suspension during the sodium hydroxide post-treatment is between pH 10 and pH 14.

4. A process according to claim 3, wherein the sodium hydroxide post-treatment is performed at temperatures of between 15° C. and 90° C.

5. A process according to claim 4, wherein the sodium hydroxide post-treatment is performed with stirring.

6. A process according to claim 1, wherein the pH value in step a) is less than or equal to 5.

7. A process according to claim 1, further comprising post-treating the yellow pigment of step a) with sodium hydroxide solution before calcining.

8. Highly transparent, red iron oxide pigments of the $\alpha$-Fe$_2$O$_3$ modification, having an Mn content of less than 0.10 wt. % and a sulphate content of less than 1.2 wt. %.

9. A process for the production of highly transparent, chemically pure, red iron oxide pigments of the $\alpha$-Fe$_2$O$_3$ modification, comprising
   a) producing yellow, highly transparent iron oxide pigments of the $\alpha$-FeOOH modification by precipitation and oxidation in an aqueous medium, starting from iron (II) sulphate solution, in such a manner that on completion of pigment formation the pH value is below 6;
   b) filtering and washing the yellow pigment of step a) until the pigment is relatively free of salt;
   c) subjecting the yellow pigment of step b) to calcination to yield red, highly transparent iron oxide pigments; and
   d) post-treating the red pigment produced by step c) with sodium hydroxide solution.

* * * * *

UNITED STATES PATENT AND TRADEMARK OFFICE
CERTIFICATE OF CORRECTION

PATENT NO. : 5,614,012
DATED : March 25, 1997
INVENTOR(S) : Ulrike Pitzer

It is certified that error appears in the above-identified patent and that said Letters Patent is hereby corrected as shown below:

In column 3, line 38, "improved coverage rate" should read -- improved colouring power--.

Signed and Sealed this

Seventeenth Day of February, 1998

Attest:

BRUCE LEHMAN

Attesting Officer

Commissioner of Patents and Trademarks